June 14, 1960 J. G. KARLET ET AL 2,941,068

AUTOMATIC SWITCHING SYSTEM FOR RAILWAY CLASSIFICATION YARD UTILIZING A PUNCHED TAPE

Filed Sept. 10, 1954 4 Sheets-Sheet 1

INVENTORS
Joseph G. Karlet and
James M. Hesser
BY W. L. Stout
THEIR ATTORNEY

June 14, 1960 J. G. KARLET ET AL 2,941,068

AUTOMATIC SWITCHING SYSTEM FOR RAILWAY CLASSIFICATION YARD UTILIZING A PUNCHED TAPE

Filed Sept. 10, 1954 4 Sheets-Sheet 3

2,941,068

Patented June 14, 1960

2,941,068

AUTOMATIC SWITCHING SYSTEM FOR RAILWAY CLASSIFICATION YARD UTILIZING A PUNCHED TAPE

Joseph G. Karlet and James M. Hesser, Roanoke, Va., assignors to Westinghouse Air Brake Company, Wilmerding, Pa., a corporation of Pennsylvania Filed Sept. 10, 1954, Ser. No. 455,118

11 Claims. (Cl. 246—2)

Figure 1:
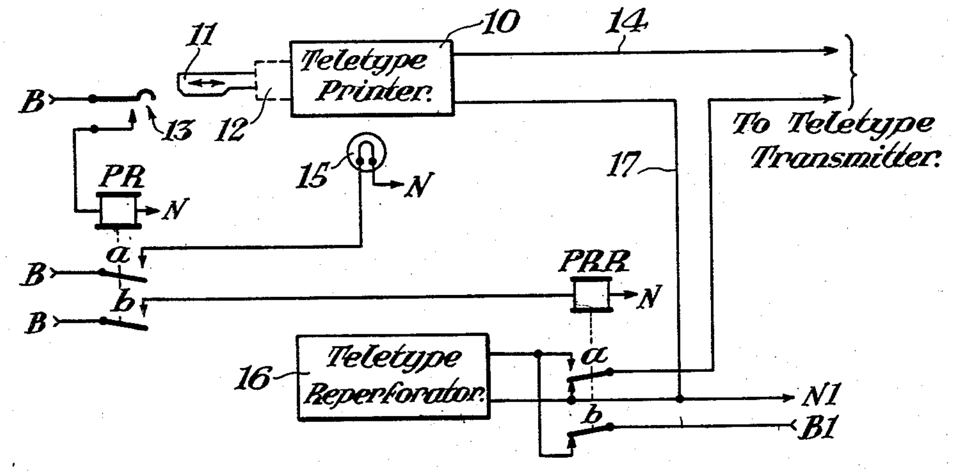

This invention relates to a system for storing selected information from a reported group of facts by recording such selected data on a punched tape in accordance with a prescribed code and for utilizing the code-bearing tape to provide an operating voltage in a selected one of a plurality of electrical circuits according to the information contained on the tape. More specifically, the invention is a system for recording on Teletype tape railroad classification yard track numbers contained in a switch list and for reading the tape to convert the coded punched marks on the tape to control storage relays whereby an operating voltage is placed on a circuit corresponding to the classification track indicated on the tape.

By proper connection of these circuits to an automatic switching system the information stored on the punched tape may be used to actually control the switches in a classification track to thereby route each car or cut of cars to the classification track indicated on the switch list.

In a typical classification yard, cars are allowed to roll from a hump or hill on a single track which diverges into a large number of storage tracks through suitable track switches. Switch lists are prepared for each train indicating where each car or cut of cars is to be routed. An operator, using the information contained in the switch lists, operates controls for the track switches to route each car or cut of cars to the designated classification track.

Classification yards are now being equipped with automatic switching systems which automatically control switch positions along the route from the hump to the selected classification track in response to manipulation of a push button or lever or combination of push buttons or levers representing the desired storage track. Such an automatic switching system is shown in application for Letters Patent of the United States, Serial No. 355,281 filed on May 15, 1953, now U.S. Patent 2,863,991 granted Dec. 9, 1958, in the name of Benjamin Mishelevich for Automatic Control of Railway Classification Yard Track Switches and also in Manual 517 of Union Switch & Signal Division of Westinghouse Air Brake Company dated January 1953 and entitled, "Union" Automatic Switching for Classification Yards.

A detailed explanation of an automatic switching system may be obtained by reference to the aforementioned application. However, for the purpose of illustrating how the present invention may be utilized with such a system the following brief description should suffice. Route descriptions are entered into the apparatus by the operation of push buttons or other manually operable contacts which designate the final storage track to which the particular car or cut of cars is to be directed. The apparatus includes a system of interconnected relay circuits arranged in groups designated as storage units. In general, one storage unit is provided for each switch location in the classification yard and each of the storage units is sub-divided into a plurality of storage banks. One storage bank is provided for each route description which may be stored in such storage unit at any particular time, as determined by the construction of the classification yard and the number of cars or cuts of cars which can be moving through the yard between successive switches at any one time.

Route descriptions which are entered into the apparatus are always entered into the first bank of the initial storage unit and are automatically cascaded from the first bank to the subsequent storage banks providing those banks are empty. The track switch associated with a particular storage unit is controlled to the position indicated by the condition of the storage relays in the last bank of the particular storage unit.

As a particular car or cut of cars enters a detector track section associated with the storage unit, the information stored in the last bank of that storage unit is forwarded to the initial bank of the next storage unit.

Route descriptions are stored in the storage banks of the initial unit in a digital form, that is, by providing a storage relay for each storage track in the classification yard. The route descriptions stored in the final bank of digital storage relays in the initial unit are translated into a combination code before transfer to succeeding units. This results in a savings of storage relays since a smaller number of storage relays is necessary when the combination code is being used. Digital code is employed in the initial storage unit however, so that a visual indication of the route descriptions entered into the initial storage unit may be conveniently presented to the operator.

Each storage bank has associated therewith a storage detector relay which, by being energized, indicates that a train description or routing is stored in the associated bank. A storage transfer relay in each storage bank accomplishes the transfer of the information contained in its related bank to the next succeeding bank. In addition, there is provided a cancellation relay operable by a cancellation push button for cancelling the storages in succession from the initial bank to the final bank of the initial storage unit.

In this invention, the storage track information is selected from the information contained in a switch list prepared for each train and the storage track information recorded on a punched tape. The coded tape is then passed through a tape reading circuit which converts the information to a digital code. Relays are operated in accordance with the code to select the corresponding circuit from a plurality of circuits equal in number to the number of storage tracks. These circuits are connected to the storage relays in the initial bank of the initial unit of the automatic switching system so that energization of a particular circuit causes energization of the corresponding relays in said initial storage bank. Connections are also made from the storage detector relays and storage transfer relays and from the cancellation relay in said initial bank to the automatic selector to synchronize and correlate operation of the automatic selection unit with the automatic switching system.

It is an object of this invention to teach the construction of an automatic circuit selector which will select a particular class of information from a tabulated list of information and utilize this information to control the selection of a particular one of a group of circuits.

It is also an object of this invention to show the construction of an automatic route selection unit which will select a particular class of information from a tabulated list of information and convert such information to a form usable to control the operation of an automatic switching system in accordance with said selected information.

This invention has for another object the demonstration of means for preparing a coded punched tape so that there will be recorded on said tape a selected class of information from a tabulated list of information.

A further object of this invention is to provide relays and associated mechanism for converting coded information representing groups of two figures each recorded on a punched tape into relay contact positions to select a particular one of a group of circuits in accordance with the information contained on the punched tape and for rejecting such information in the event that the code group being interpreted contains a character included in a predetermined group of characters.

A further object of this invention is to provide a system wherein the first of a group of two successive digits recorded on a punched tape is stored in a relay while the second of said successive digits is being interpreted and to then select a circuit out of a group of circuits in accordance with the number composed of the two digits or to cancel the storage in the event that a second digit does not follow the first or in the event that a cancellation figure follows the first figure.

Another object of this invention lies in the provision of control circuits for initiating the coding and decoding and circuit selection operations of the equipment in synchronism with predetermined reference periods, and causing said coding and decoding and circuit selection operations to take place according to a predetermined sequence.

Figure 2A:
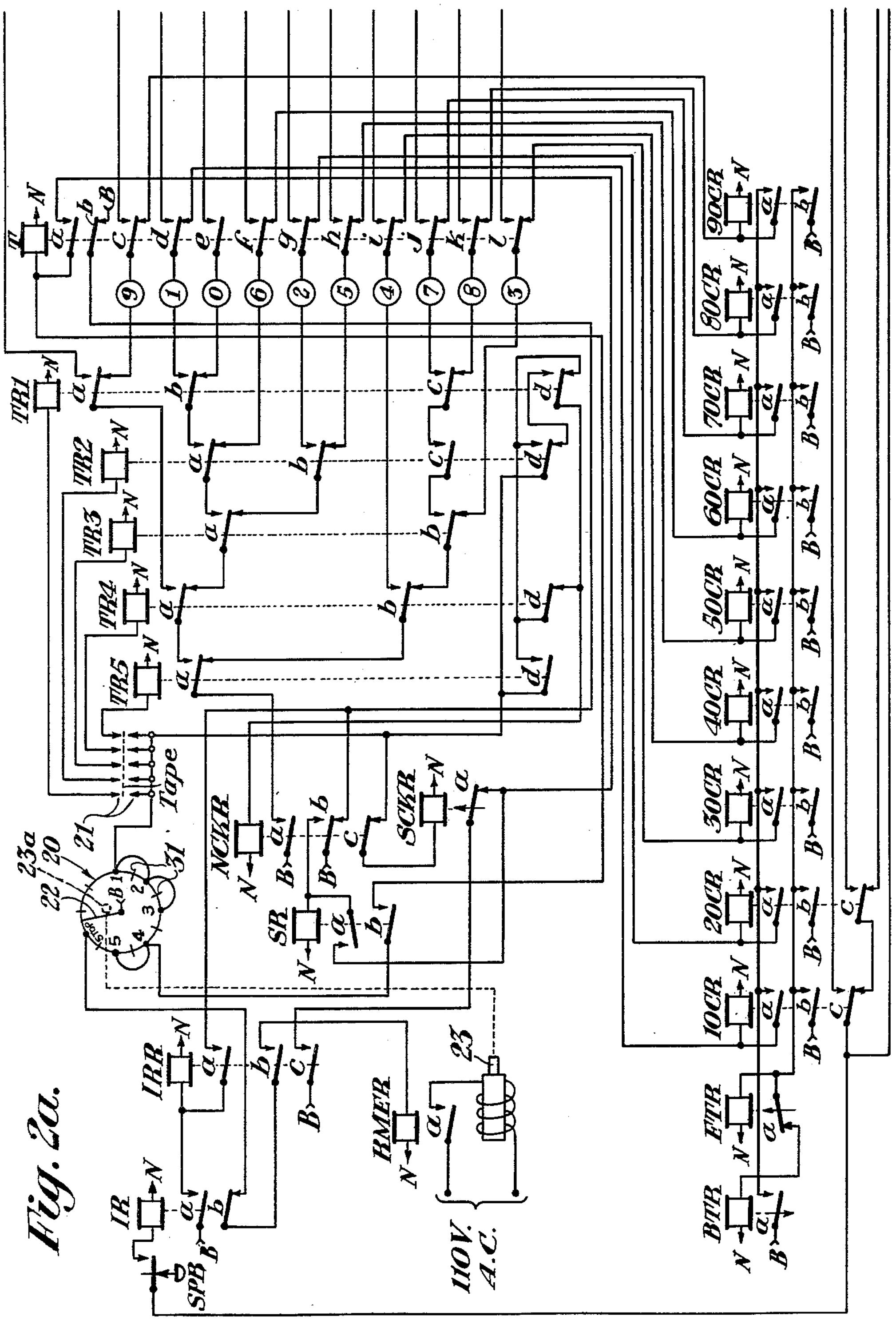
Figure 2B:
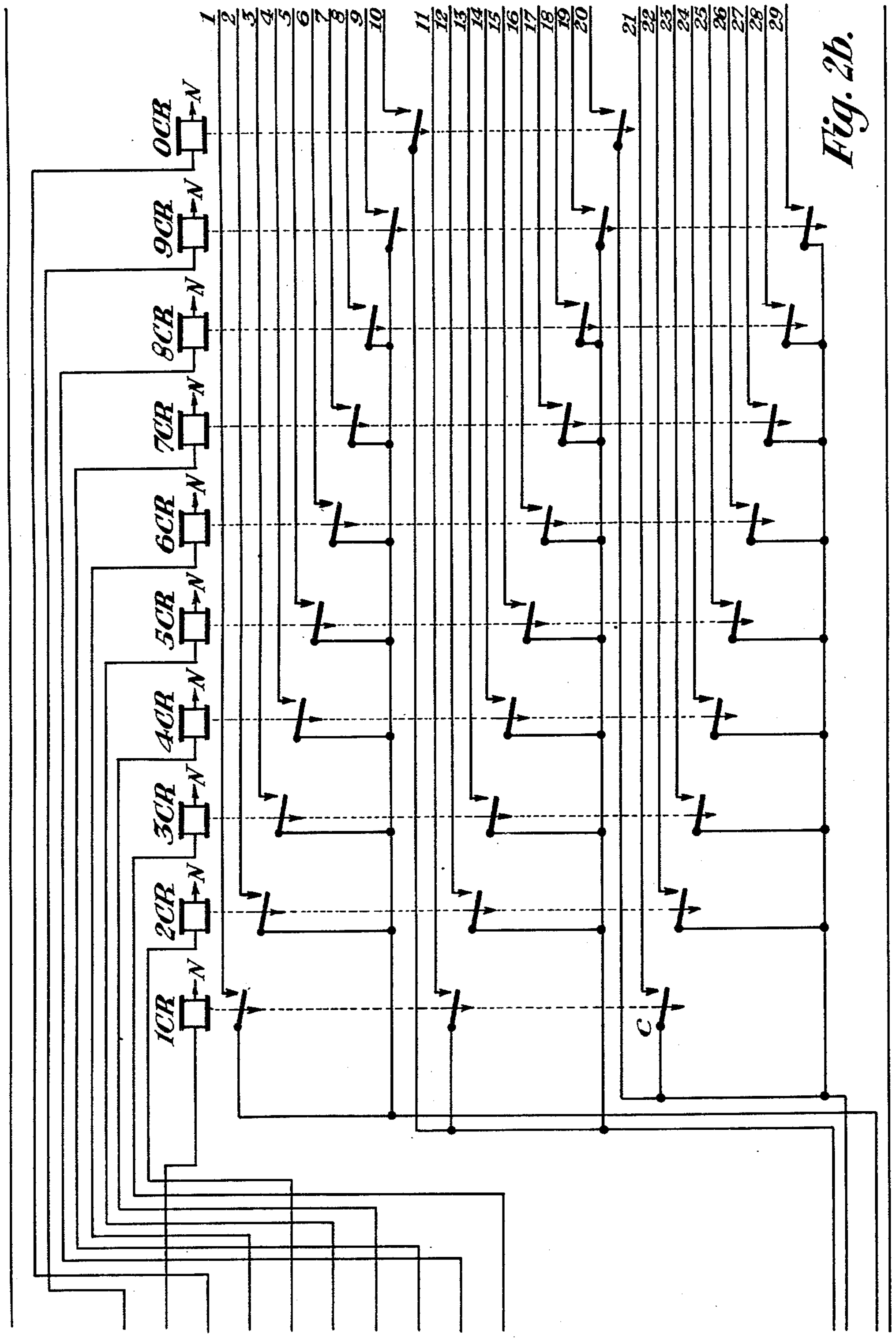
Figure 2C:
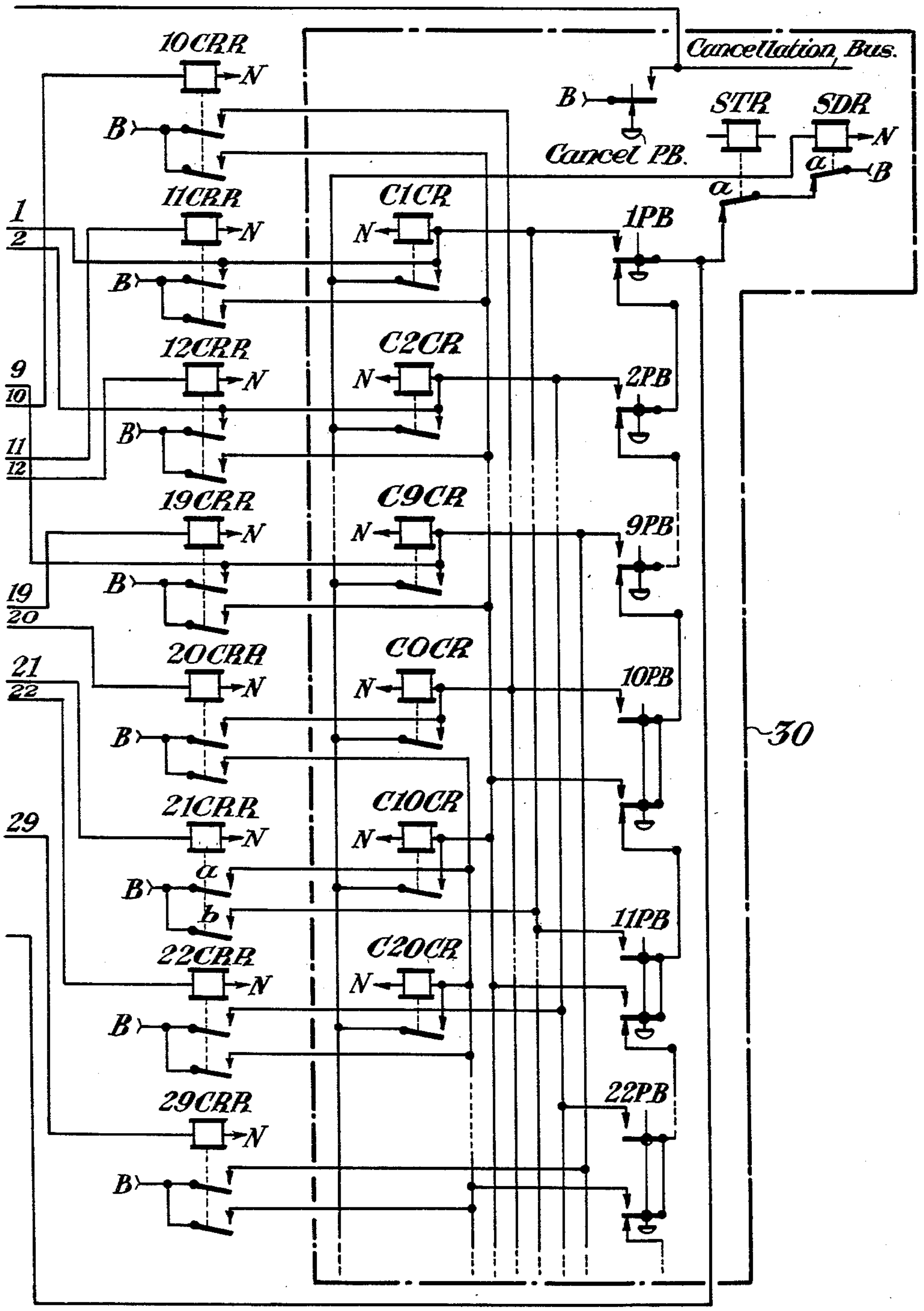

These and other objects of this invention and their attendant advantages will become apparent from the study of the following specification and drawings in which Fig. 1 shows the tape punching portion of the equipment partly shown in block form; and Figs. 2*a*, 2*b* and 2*c* when placed together illustrate the tape reading and circuit selection portion of the equipment together with adjunctive controls. In Fig. 2*c* equipment which is part of an automatic switching system is enclosed within the block 30.

Figure 3:
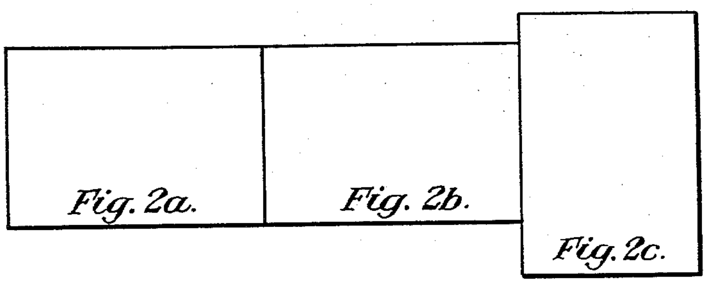

Fig. 3 shows the correct orientation of Figs. 2*a*, 2*b* and 2*c*.

Portions of an automatic switching system such as that disclosed in the above-mentioned application are also shown to demonstrate interconnections whereby the present invention may be used in conjunction with such a machine.

The railroad switch list for use at classification yards is a tabulated list of information usually including the following information: name of the railroad which owns the car, car number, car type, car weight, origin, destination of car and storage track to which the car is to be sent. The information for a switch list is usually received at the yard tower by Teletype from a yard office or other source. To prepare a coded tape containing only the storage track numbers, a Teletype printer in the yard tower is arranged to control a switch which controls the closing of a circuit to a Teletype reperforator during the time that each line of the tabulated column of storage track numbers is being received. The perforated tape thus prepared becomes a coded record of the storage track destination of each car or cut of cars.

It may be seen by reference to Fig. 1 that Teletype printer 10 is connected to incoming Teletype line 14. A cam 11 is mounted on carriage 12. The cam is mounted and adjusted so that switch 13 will be closed during the time that information for the column containing storage track data is being received.

The exact period of time during which switch 13 is closed and the reperforator 16 is operative is not material except that it must at least include the time during which the storage track number is being transmitted but cannot include any portion of the time when characters representing information in either a preceding or a following column of the switch list are being transmitted. That is, the switch 13 is closed at least while the printer is printing the storage track numbers. Since the switch list is in tabulated form, it is a simple matter to orient the cam 11 and the switch 13 so that the switch is closed by the cam while the printer carriage is in the position in which track numbers are being printed. The cam shape and spacing also determine the length of time the switch is closed. This could be limited to the time when the two digits representing track numbers are being printed but, as a practical matter, is made long enough to include one or two spaces on each side of the number. Thus, the tape, in addition to coded track numbers, will actually have code marks indicating spaces. However, the "space" marks will be rejected, as appears hereinafter, and do not affect the selection of a circuit.

When the switch is closed, relay PR picks up. When relay PR is picked up, its contact *a* closes a circuit for lighting the lamp 15 to indicate that the reperforator circuit is closed and its contact *b* closes a circuit for energizing relay PRR. Relay PRR, with its contacts *a* and *b*, controls the connections to a Teletype reperforator 16. With relay PRR deenergized, contact *a* will be closed at its back point and Teletype intelligence on line 17 is bypassed at the back point of contact *a* to the Teletype transmitter. A local battery having terminals B1 and N1 is provided to supply energy to the reperforator when no energy is being fed to the reperforator from the Teletype line. When relay PRR is deenergized, energy is connected from terminal B1 through the back point of contact *b* of relay PRR through the Teletype reperforator to terminal N1. This keeps the reperforator from running open, a condition wherein it continues to code space marks into the tape.

With relay PRR up, the local battery circuit through contact *b* will be broken and the reperforator 16 will be placed in series with printer 10 in a circuit including the front point of contact *a* of relay PRR. The reperforator 16 therefore will punch on a tape the intelligence being transmitted in the Teletype line whenever relay PR and repeater relay PRR are up.

To utilize the punched tape to accomplish the selection of a circuit, as, for example, would be done in employing the equipment with an automatic switching system, there is provided a tape reading or translating arrangement and a circuit selection arrangement. Tape reading relays TR1, TR2, TR3, TR4 and TR5 are employed along with tens-unit digit transfer relay. The tape reading equipment also includes a segment type distributor 20, a start relay IR, a start relay repeater relay IRR, a release magnet energizing relay RMER, a numeral checking relay NCKR, a stick relay SR and a synchronization checking relay SCKR.

The storage track information on the switch list consists of two consecutive digits representing the storage track number. For numbers under 10 the storage track number is preceded by a zero. Therefore, when a display is presented to the operator, he can easily check that a proper registration has been made by noting whether two digits have been registered. To insure that no incomplete track selections or improper track selections are sent through the automatic selector, relay NCKR checks to prevent operation of the automatic selector when the figure entered into the machine by the tape is one of a predetermined list of characters and relay SCKR causes any registration to be cancelled unless the first numeral entered into the system is immediately followed by a second numeral.

The first digit of the track number is registered and stored in one of the tens digit storage relays 10CR, 20CR, 30CR, 40CR, 50CR, 60CR, 70CR, 80CR and 90CR unless it is a zero, in which case no registration takes place. Relays BTR and ETR are arranged to hold the storage in the tens digit storage relay until the second digit is registered in one of the unit digit storage relays 0CR, 1CR, 2CR, 3CR, 4CR, 5CR, 6CR, 7CR, 8CR or 9CR. With this arrangement, the automatic selector is capable of selecting a circuit represented by a number from 01 to 99. The selected circuit is energized and may be used to control any desired equipment, such as, for example in this case, an automatic switching system.

When required, as in the case when the selector is to be used with an automatic switching system, one or more repeater relays such as relays CRR may be interpreted between circuits selected by the automatic selector and the external circuits to be controlled so that more than one external circuit may be controlled by each of the selected circuits.

In Fig. 2*a* the tape translating equipment is seen to include the segment type distributor 20 and tape reading contacts 21. The distributor 20 has segments designated 1, 2, 3, 4, 5 and "Stop" separated by insulators 31 and a wiper arm 22 which passes over the segments consecutively and is connected to terminal B of a source of power. The arm 22 is driven by a continuously rotating motor through a friction drive means, the motor and drive means not being shown. The arm 22 is normally held against rotation by a detent, not shown, controlled by a release magnet 23. When the release magnet is energized the detent will be withdrawn and the arm 22 will be driven through one complete revolution even though the detent is released before the revolution is completed. Contact *a* of a release magnet energizing relay RMER controls the application of energizing voltage to the release magnet to withdraw the detent. An initiating contactor such as a push button SPB, a contact of a track instrument, not shown, or a contact of a track relay, not shown, is provided to begin a translating operation. The initiating contactor controls the operation of a starting relay IR which in turn controls a starting relay repeater IRR. Relay IRR, in turn, controls the release magnet energizing relay RMER and a stick circuit for stick relay SR. When the distributor wiper arm is on segments 1, 2 and 3, battery is supplied to the lower set of tape reading contacts 21 energizing one or more of the relays TR1, TR2, TR3, TR4 or TR5 in accordance with the code punched into the tape.

If the combination of TR relays energized indicates that a number is being read, a number checking relay NCKR will be energized through a circuit including contacts *d* of the TR relays. Relay NCKR will remain deenergized when a space, figure shift, letter shift or any other character on the tape causes the tape reading relays to be energized in any combination that does not provide a path from the tape reading contacts to relay NCKR through contacts of the TR relays. This path is closed for any number and for the letter *x*.

Relay NCKR energized puts battery on the translating contacts of the TR relays, closes the energizing circuit for the stick relay SR and is also included in the energizing circuit for the sequence checking relay SCKR and in the stick circuit for relay IRR. Relay SR controls the energizing circuit for the tens-unit digit transfer relay T and relay SCKR, the sequence checking relay, checks to determine that two numbers are grouped together to indicate a storage track. If two numbers do not follow in sequence, relay SCKR picks up causing cancellation of any registration in the tens digit storage relays.

Relay T is the tens-unit digit transfer relay. In its deenergized position it sends the first digit of each two digit storage track number to the tens digit storage relays 10CR, 20CR, 30CR, etc., and in its energized condition sends the second digit of each set of two consecutive digits to the unit digit storage relays 1CR, 2CR, 3CR, etc.

Relays BTR and ETR are timing cycle relays that determine the time during which the tens digit storage relays will be energized. Whenever any one of the tens digit storage relays picks up it completes an energizing circuit for relays BTR and ETR in parallel. Relay ETR is slow pick-up so relay BTR will pick up first completing a stick circuit for the tens digit storage relay which has been energized. When relay ETR picks up it opens the energizing circuit for relay BTR which releases, breaking the holding circuit for the tens digit storage relays.

Where it is desired to control more than one external circuit with the circuit selected by the automatic selector, as would be the case in entering track selections for storage tracks numbered ten and above into an automatic switching system, repeater relays such as relay 10CRR may be added to the automatic selector.

A more complete understanding of the invention may be obtained from the following description of the operation of the invention under various conditions.

For the first example, assume that the automatic selector is to be used in conjunction with an automatic switching system and that a tape has been punched bearing storage track information taken from the switch list. Assume further that the tape is properly placed in the distributor and that the storage track indicated on the portion of the tape being fed to tape-reading contacts 21 is track 21. To begin operation of the circuit selector, initiating contactor SPB is closed. This contactor may be a manually operated push button or a contact on a train operated device such as a track instrument or track relay whereby there is afforded some degree of synchronization between the interpretation of additional storage track destinations and movement of cars in the classification yard. This completes an energizing circuit for the relay IR which may be traced from terminal B of a source of current, through the back contact *a* of a storage detector relay SDR associated with the first bank of the initial unit in the automatic switching system, through a back contact *a* of the storage transfer relay STR for the first bank of the initial unit in the automatic switching system, contactor SPB closed, and the winding of relay IR to terminal N. With relay IR up, an obvious energizing circuit for relay IRR is completed through front contact *a* of relay IR. Relay IRR is maintained energized by a circuit which may be traced from terminal B, through back contact *b* of relay NCKR, front contact *a* of relay IRR and the winding of relay IRR to terminal N. Back contact *b* of relay T is connected in parallel with back contact *b* of relay NCKR in the the stick circuit for relay IRR.

When the initiating contactor SPB is released, relay IR is deenergized and the release magnet energizing relay RMER is energized by a circuit extending from terminal B through the wiper arm 22 of the distributor, the "Stop" segment of the distributor, back contact *b* of relay IR, the front contact *b* of relay IRR, and the winding of relay RMER to terminal N. With the release magnet energizing relay picked up, energy is supplied through its front contact *a* to the release magnet 23 which lifts the detent 23*a* from the Teletype distributor arm driving means permitting the arm 22 of the distributor to be driven through one complete revolution.

It is noted that the contactor SPB must be closed and then released before relay RMER will pick up and permit rotation of the Teletype distributor. This arrangement permits only one track selection to be made for each operation of initiating contactor SPB and prevents inadvertent continuous rotation of the distributor in case the initiating contactor SPB is held closed for a longer period of time than is necessary.

When the arm 22 of Teletype distributor 20 reaches segment 1 of the distributor and until it leaves segment 3 of the distributor, energy is applied to the lower set of the tape reading contacts 21 and will pass over to the upper set of the contacts to energize one or more of the tape reading relays TR1, TR2, etc. in accordance with the punched marks in the tape at that particular point. Energy from terminal B will also be applied through segments 1, 2 and 3 of the distributor and contact *c* of relay NCKR in its deenergized position to the winding of relay SCKR, the sequence checking relay. Relay SCKR, however, being a slow pick-up relay, does not immediately pick up.

With the tape punched to indicate track 21, the punch marks in the tape for the first numeral 2, will cause relays TR1, TR2 and TR5 to pick up, while relays TR3 and TR4 remain deenergized. Since the combination of the TR relays picked up indicates a numeral in accordance with standard Teletype code, number checking relay NCKR will be energized and will pick up its contacts, applying battery from terminal B through its front contact *a* to the tape interpreting contacts of the TR relays. When the number 2 is being read, relay NCKR will be energized over a circuit from terminal B of the source of energy, arm 22 of the Teletype distributor, segments 1, 2, 3 of the distributor, front contact *d* of relay TR5, back contact *d* of relay TR4 and the winding of relay NCKR to terminal N.

Relay NCKR energized also completes an obvious energizing circuit for relay SR through its front contact *b* and opens the holding circuit previously traced for relay IRR. However, relay IRR remains stuck up over back contact *b* of relay T. The energizing circuit for relay SCKR is interrupted at back contact *c* of relay NCKR so that the sequence checking relay remains down.

Relay SR is stuck up by a circuit extending from terminal B of the power supply, through front contact *c* of relay IRR, back contact *a* of relay SCKR, front contact *a* of relay SR, and the winding of relay SR to terminal N of the power supply.

With relays TR1, TR2 and TR5 picked up according to the example and relay T deenergized, an energizing circuit will be completed for relay 20CR extending from terminal B of the power supply, through front contact *a* of relay NCKR, front contact *a* of relay TR5, back contact *a* of relay TR4, back contact *a* of relay TR3, front contact *b* of relay TR2, back contact *g* of relay T and the winding of relay 20CR to terminal N of the power supply. Relay 20CR picks up its contacts *a* and *b* applying energy through its front contact *b* from terminal B of the power supply, through the winding of relay ETR to terminal N of the power supply and also through back contact *a* of relay ETR and the winding of relay BTR to terminal N of the power supply. Relay BTR closes its front contact *a* to complete a holding circuit for relay 20CR for the circuit including front contact *a* of relay 20CR, but relay ETR, because of its delayed pick-up characteristics, does not pick up immediately. At a later time, relay ETR picks up its contact *a* opening the energizing circuit for relay BTR, which releases its contact *a* at a time determined by its slow release characteristics, to in turn open the holding circuit for relay 20CR.

When the rotating arm 22 of the Teletype distributor leaves segment 3, the energizing circuit for relay NCKR is opened and that relay releases its contacts.

With relay NCKR deenergized, the energizing circuit for relay 20CR is opened at front contact *a* of relay NCKR. Relay 20CR, however, remains energized over the circuit established by relay BTR until the end of the time period required for completion of the operating sequence of relays BTR and ETR. The parallel holding circuit for relay IRR is reestablished at back contact *b* of relay NCKR and the energizing circuit for relay SR is opened at front contact *b*. Relay SR however, remains energized over its previously traced holding circuit. As the arm 22 of the Teletype distributor continues to rotate and contacts segment 4, energy is applied through a circuit including contact *b* of relay SR to pick up relay T which is then held up over a circuit extending from terminal B of the source of energy, through front contact *c* of relay IRR, back contact *a* of relay SCKR, front contact *a* of relay T and the winding of relay T to terminal N of the source of energy.

Relay T remains energized over its holding circuit when its energizing circuit becomes open by contact arm 22 moving off segment 5 of the distributor. As the arm reaches the "Stop" segment, relay RMER is again energized, releasing the detent and permitting the contact arm 22 to be driven through another complete revolution in the manner previously described. As the contact arm begins each revolution, the punched tape is pulled through the tape reading contacts and positioned so that the code marks for the next character may be sensed by the contacts.

According to the example, relays TR1, TR2, TR3, and TR5 are energized by closure of the associated tape reading contacts, designating the numeral 1. The number checking relay NCKR is energized over a circuit including front contact *d* of relay TR5 and back contact *d* of relay TR4.

Energy is now applied from terminal B of the source of energy, through front contact *a* of relay NCKR, front contact *a* of relay TR5, back contact *a* of relay TR4, front contact *a* of relay TR3, front contact *a* of relay TR2, front contact *b* of relay TR1, front contact *d* of relay T, and the winding of relay 1CR to terminal N of the source of energy. Relay 1CR picks up its contacts and with relay 20CR stuck up, completes the selection of circuit 21. Energy is applied to circuit 21 and thus to relay 21CRR by a path which may be traced from terminal B of the power supply, through back contact *a* of relay SDR, back contact *a* of relay STR, back contact *c* of relay 10CR, front contact *c* of relay 20CR and front contact *c* of relay 1CR, picking up relay 21CRR.

For use of the automatic selector with an automatic switching system, relay 21CRR must be provided since the selection of track 21 requires that both relay C20CR and C1CR in the automatic switching system be energized. As previously explained, storages in the initial storage unit are in digital code so that a visual indication may readily be presented to the operator. The most economical form of arrangement for a digital code, from the standpoint of the number of storage relays required, is to employ one set of relays representing unit digits from 0 to 9 and one relay for each tens digit. Thus, with nineteen relays, it is possible to register numbers from 1 to 99 to accommodate a 99-track yard, whereas if each relay stored a specific number from 1 to 99, ninety-nine relays would be required in each bank of the storage unit. In the preferred system, the number 21 would be indicated by eneergizing the tens digit relay corresponding to 20 and the unit digit relay corresponding to 1. Contacts of these two relays in the switch machine are placed in series in the control circuits for the switches included in a route to track 21. This arrangement is shown in Manual 517. Relays C20CR and C1CR are energized by obvious circuits involving contacts *a* and *b* of relay 21CRR. Relay 21CRR is energized directly from circuit 21, the energization of which is described above.

Relays C20CR and C1CR, when energized, effect the entry of track 21 into the automatic switching system.

Upon the translation of numeral 1 by the tape reading relays TR, front contact *b* of relay NCKR completes an energizing circuit for relay SR and opens the holding circuit for relay IRR which releases its contacts. Release of contact *c* of relay IRR opens the holding circuits for relays SR and T. However, relay SR remains energized over the circuit established through contact *b* of relay NCKR and relay T remains energized over a stick circuit completed through front contact *a* of relay SR and front contact *b* of relay NCKR until the rotating arm 22 moves off segment 3 of the distributor. At this time relay NCKR will be deenergized and its contact *b* opens the energizing circuit for relay SR and the holding circuit for relay T. With arm 22 on segments 4 and 5, relay T continues to be energized over a circuit from terminal B, through arm 22, segments 4 and 5, front contact *b* of relay SR and the winding of relay T to terminal N. Front contact *a* of relay T, front contact *a* of relay SR and the winding of relay SR are in parallel with the winding of relay T in the circuit just traced so relay SR also remains energized. Contact *a* of relay NCKR opens the energizing circuit for relay 1CR. When contact arm 22 reaches the "Stop" segment relay SR and relay T release their contacts. Relays TR1, TR2, TR3 and TR5 are also deenergized when arm 22 moves off segment 3. This restores all the relays in the tape reading portion of the automatic selector to their initial condition and as the arm 22 is driven to the "Stop" segment the detent again engages the distributor arm 22 holding the arm at "Stop" until the initiating contactor SPB is again closed and released. Relay 20CR will release its contacts when relays BTR and ETR have gone through their cycle of operation opening the stick circuit for relay 20CR. The energizing circuit for relay 1CR was opened at contact *a* of relay NCKR so that relay 1CR will release its contacts at a time determined by its slow relase characteristics. Release of relays 20CR and 1CR also deenergizes relay 21CRR and the automatic selection system is now entirely cleared and ready for the next operation.

It is apparent that by virtue of the number checking relay NCKR and the arrangement of circuitry for the CR relays, no circuit selection will take place unless two consecutive symbols indicating numbers appear on the tape.

Assuming next a case where a mistake occurs in the switch list so that the information appearing in the tabulated storage track column is a 2 followed by a figure shift symbol. The tape reperforator shown in Fig. 1, therefore, will punch the tape with a code indicating those characters.

Now assume that the portion of the tape bearing this information reaches the tape reading contacts 21 and that the initiating contactor SPB is closed and then released. The sequence of operations described in the previous example will take place as before to store the numeral 2 in the relay 20CR. However, on the second revolution of the distributor when the contact arm 22 of the Teletype distributor reaches segments 1, 2, 3 of the distributor the holes punched in the tape will cause energization of relays TR1, TR2, TR4 and TR5. With these relays picked up there will be no energizing path through the number checking contacts *d* of the TR relays for energizing relay NCKR. With relay NCKR deenergized, the sequence checking relay SCKR is energized over a circuit which may be traced from terminal B of the power supply through the distributor arm 22, segments 1, 2, 3 of the distributor, back contact *c* of relay NCKR and the winding of relay SCKR to terminal N of the power supply. Relay SCKR picks up its contact *a* opening the stick circuits for relay SR and relay T which release their contacts. Since no unit digit relay was energized, no circuit will be selected, and relay 20CR will drop out as soon as the timing period determined by relays BTR and ETR has elapsed. The automatic selection system, therefore, will be cleared of any storages.

Relay IRR, however, remains stuck up over the back point of contact *b* of relay NCKR so that when the distributor rotating arm 22 again reaches the "Stop" segment relay RMER will be energized and will, in turn, apply energizing power to the release magnet 23. The automatic selector will then read and interpret the next set of punch marks on the tape just as if the initiating contactor SPB has been closed to begin another cycle.

The series of events just described as taking place when an incorrect or improper marking appears on the tape would also occur if the storage track information on the switch list is incomplete and only a single number has been coded into the punched tape. In preparation of the tape, when the tape is advanced without a character being marked, a "space" is coded into the tape. This is indicated by a punch mark positioned so that relay TR3 will be energized. With relay TR3 only energized, there will be no energizing path for relay NCKR through contacts *d* of the tape reading relays and operation will be as just described for the case where a numeral is followed by a figure shift symbol.

It is to be noted that for each time that the initiating contactor SPB is closed and released the automatic selector will continue to read and interpret coded punch marks on the tape until the punch marks represent a correct and complete storage track destination.

Still another feature is provided for safeguarding against errors made in preparation of the switch list. This feature consists of means for avoiding an error made in entering track storage numbers when preparing the switch list. For example, if the yard clerk preparing the switch list realizes that he had inadvertently entered the number 22 in the track storage column instead of the number 23, he enters an *x* below the incorrect number and the correct number 23 on the following line. If the cam 11 is adjusted so that the perforator circuit will be closed long enough to permit more than two characters to be marked, the *x* or the *x* and the correct number can be entered on the same line as the number 22. In any case, the number 22, the *x* and the number 23 will be consecutively coded onto the tape. The character *x* coded into the tape will cause energization of relays TR1, TR4 and TR5. Energization of this combination of relays completes a circuit extending from terminal B of the power supply, through contact *a* of relay NCKR, front contact *a* of relay TR5 and front contact *a* of relay TR4 to front contact *a* of relay TR1. Front contact *a* of relay TR1 may be connected to the cancellation bus in the automatic switching system to thereby effect cancellation of the last storage entered into the initial storage unit. The next operation of the initiating contactor will cause the correct storage track information to be entered into the initial storage bank.

For reasons of clarity and conciseness all of the contacts of the digit storage relays CR have not been shown. Each of the tens digit storage relays has a contact like contact *c* of relays 10CR and 20CR connected to a bank of contacts of the unit digit storage relays like those shown in Fig. 2*b*. By this arrangement, it is obvious that the contact connections of the CR relays will provide means for selecting a circuit represented by numbers from 1 to 99. For simplicity, all connections to the automatic switching system have not been shown. However, sufficient detail is included to clearly illustrate the scheme of interconnections to one skilled in the art.

It is also pointed out that although the automatic selector has been described with connections to an automatic switching system for use in a railway classification yard, it is by no means intended to limit the application of this invention to that particular field. The object and true scope of this invention is to provide means for recording in code, on a punched tape, information selected from a particular column of a sheet of tabulated information and to provide a system for interpreting and utilizing this information to select and energize a particular one of a set of externally connected circuits in accordance with the code information.

Although there is herein shown and described only one form of an automatic circuit selector constructed in accordance with the invention, it is to be understood that various changes and modifications may be made therein within the scope of the appended claims without departing from the spirit and scope of the invention.

Having thus described our invention, what we claim is:

1. In apparatus for punching code marks into a tape in accordance with electrical impulses representing the information contained in a selected column of a sheet of tabulated data, in combination, a tape perforator, means for generating electrical impulses representing data, converting means for converting impulses into printed legible characters arranged in columnar tabulated form, said converting means having a carriage movable in accordance with the column in which data is to be printed, means controlled by said generating means for applying said impulses to said converting means, means operable to supply said impulses to said tape perforator, and means actuated by said carriage in a position corresponding to a selected column for controlling said operable means to supply the perforator only with the impulses representing the data in the selected column.

2. Apparatus of the class described, comprising, in combination, first storage means, means controlled by a code sequence punched in a tape for actuating said storage means to store said code, checking means controlled by said storage means and actuated from a first to a second condition by any of a predetermined group of codes stored in said storage means, second storage means, and means controlled by said first storage means and said checking means for storing said code in said second storage means when said checking means is in its second condition.

3. Apparatus for storing first and second characters represented by sequential punched sequences in a tape, comprising, first storage means, interrogating means controlled by said tape for controlling said first storage means to store a code corresponding to one of said punched sequences, means for periodically advancing said tape to supply said punched sequences in pairs at fixed intervals to said interrogating means, checking means controlled by said first storage means and actuated from a first to a second condition by any of a predetermined group of codes stored in said first storage means, second storage means, transfer means controlled by said advancing means and said checking means and actuated to a first or a second condition according as said checking means is in its first or its second condition when said advancing means supplies a sequence to said interrogating means, means controlled by said transfer means, said checking means and said first storage means for storing a code in said second storage means when said transfer means is in its first condition and said checking means is in its second condition, means for maintaining the storage in said second storage means for an interval longer than said fixed interval, third storage means, and means controlled by said transfer means, said checking means and said first storage means for storing a code in said third storage means when said transfer means is in its second condition and said checking means is in its second condition.

4. An automatic circuit selector for selecting one of a plurality of circuits in accordance with two consecutive numerical digits recorded on a coded punched tape, comprising, a plurality of tape reading relays, tape controlled means for energizing said relays in combinations to indicate the significance of intelligence coded into the tape, tape advancing means for supplying two successive recorded digits to said tape controlled means, checking means, means controlled by said relays for actuating said checking means to a first or a second condition according as said coded information being interpreted represents or does not represent a numeral, a plurality of digit registering relays separated into first and second banks, means controlled by said tape reading relays and said checking means for registering the first of said digits in said first bank in accordance with the energized combination of said tape reading relays when said checking means is in its first position, means controlled by said tape reading relays and said checking means for registering the second of said digits in said second bank when said checking means is in its first position, a plurality of circuits, and means controlled by said banks of digit registering relays for energizing one of said circuits in accordance with said registered digits.

5. In combination, a first group of relays, a second group of relays, a third group of relays, sequencing means for energizing said first group of relays in a combination representing a first digit and a fixed time thereafter energizing said first group of relays in a combination representing a second digit, means controlled by said sequencing means and said first group of relays for energizing said second group of relays in a combination representing said first digit, time delay means for maintaining said second group of relays energized for a time in excess of said fixed time, means controlled by said sequencing means and said first group of relays for energizing said third group of relays in a combination representing said second digit, a plurality of circuits, and means controlled by said second and third group of relays for energizing one of said circuits in accordance with said digits.

6. In an automatic circuit selector for selecting one of a plurality of circuits as designated by two consecutive numerical digits recorded on a coded punched tape according to a multi-element code, the combination comprising, a plurality of tape reading relays equal in number to the number of elements in the code, a first bank of digit registering relays, a second bank of digit registering relays, transfer means normally in a first condition and operable to a second condition, means for energizing a combination of said tape reading relays in accordance with a first digit, means controlled by said tape reading relays and said transfer means in its first condition for energizing one of said digit registering relays in said first bank selected in accordance with the energized combination of said tape reading relays, means for maintaining said selected relay energized for a predetermined time interval, means for energizing a combination of said tape reading relays in accordance with a second digit within said time interval, means for operating said transfer means to its second condition, and means controlled by said tape reading relays and said transfer means in its second condition for energizing one of said digit registering relays in said second bank selected in accordance with the energized combination of said tape reading relays.

7. In an automatic circuit selector for selecting one of a plurality of circuits as designated by two consecutive numerical digits recorded on a coded punched tape according to a multi-element code, the combination comprising, a plurality of tape reading relays equal in number to the number of elements in the code, a first bank of digit registering relays, a second bank of digit registering relays, sequencing means controlled by said tape for energizing a first and second combination of said tape reading relays in accordance with a first and second digit at a predetermined interval, transfer means controlled by said sequencing means and said tape reading relays for energizing a relay in said first bank in accordance with the first energized combination of said tape reading relays, a slow pickup relay, a slow release relay, the combined pickup and release times of said slow relays being greater than said predetermined time interval, means for energizing said slow release relay when said slow pickup relay is deenergized and any relay of said first bank is energized, means for energizing said slow pickup relay when any relay of said first bank is energized, means for maintaining energized any energized relay of said first bank when said slow release relay is energized, and means controlled by said sequencing means and said tape reading relays for energizing a relay in said second bank in accordance with the second energized combination of said tape reading relays.

8. An automatic circuit selector for selecting one of a plurality of circuits as designated by two consecutive numerical digits recorded on a coded punched tape according to a multi-element code, comprising, in combination, a plurality of tape reading relays equal in number to the number of elements in the code, tape controlled means for energizing said relays in a combination determined by a code on a tape, checking means controlled by said relays for registering by a first or second condition whether or not the energized combination of said relays represents a digit in said code, a first bank of digit registering relays, a second bank of digit registering relays, sequencing means for actuating said tape controlled means to energize a first and second combination of said tape reading relays in accordance with a first and second digit at a predetermined interval, transfer means controlled by said sequencing means, said tape reading relays and said checking means in its first condition for energizing a relay in said first bank selected in accordance with the first energized combination of said tape reading relays, means for maintaining said selected relay energized for a predetermined time in excess of said interval, means controlled by said sequencing means, said tape reading relays and said checking means in its first condition for energizing a relay in said second bank selected in accordance with the second energized combination of said tape reading relays, a plurality of circuits, and means controlled by said selected relays in said first and second banks for energizing one of said circuits selected in accordance with said first and second digits.

9. Information storage means, comprising, in combination, switching means having first and second circuit closing positions with intermediate open positions, means for operating said switching means at a fixed rate to alternate circuit opening and closing positions, first storage means, means controlled by said switching means in its first circuit closing position for storing information in said first storage means, transfer means having first and second conditions, means controlled by said switching means in its second circuit closing position for actuating said transfer means to its second condition, second storage means, third storage means, means controlled by said first storage means and said transfer means for transferring the contents of said first storage means to said second storage means when said transfer means is in its first condition, and means controlled by said first storage means and said transfer means for transferring the contents of said first storage means to said third storage means when said transfer means is in its second condition.

10. In an automatic circuit selector controlled by data recorded on a punched tape, in combination, a coded tape, a plurality of tape reading relays, a plurality of tape reading contacts equal in number to the number of tape reading relays, a distributor having a segmented contact and an associated rotating contact, releasable means for holding said rotating contact against rotation, means for releasing said releasable means for a controlled period of rotation of said rotating contact, a plurality of registering relays separated into two banks, transfer means having first and second conditions for registering in one or the other of said banks, respectively, the condition of said tape reading relays, means controlled by the contacts of said distributor in a first rotated position for energizing a first combination of said tape reading relays over ones of said tape reading contacts closed through a first code in said tape, means controlled by said tape reading relays and said transfer means in its first condition for registering the condition of said tape reading relays in said first bank, means controlled by the contacts of said distributor in a second rotated position for actuating said transfer means to its second condition, means controlled by the contacts of said distributor upon returning to said first rotated position for energizing a second combination of said tape reading relays over ones of said tape reading contacts closed through a second code in said tape, and means controlled by said tape reading relays and said transfer means in its second condition for registering the condition of said tape reading relays in said second bank.

11. In an automatic switching system, routing means for controlling the position of track switches leading to storage tracks of a classification yard in accordance with a storage track selection code supplied thereto, means for generating electrical impulses representing tabulations on a railroad switch list, said track selection codes corresponding to a selected column of data on said list converting means for converting impulses to printed legible characters arranged in columnar tabulated form, said converting means having a carriage movable in accordance with the column in which data is to be printed, means controlled by said generating means for applying said impulses to said converting means, a tape perforator, means operable to supply said impulses to the tape perforator, means actuated by said carriage in a position corresponding to a selected column for controlling said operable means to supply the perforator only with the impulses representing the data in the selected column, means controlled by said tape perforator for converting the information on said tape to an electrical track selection code, and means for supplying said track selection code to said routing means.

References Cited in the file of this patent

UNITED STATES PATENTS

| | | |
|---|---|---|
| 1,701,053 | Peirce | Feb. 5, 1929 |
| 2,045,695 | Brown | June 30, 1936 |
| 2,081,900 | Brown et al. | June 1, 1937 |
| 2,131,946 | Gibbs | Oct. 4, 1938 |
| 2,194,057 | Simpson | Mar. 19, 1940 |
| 2,206,550 | Mordin | July 2, 1940 |
| 2,266,779 | Loughridge | Dec. 23, 1941 |
| 2,285,289 | Lake et al. | June 2, 1942 |
| 2,302,081 | Weitmann | Nov. 17, 1942 |
| 2,318,299 | Doty | May 4, 1943 |
| 2,320,150 | Loughridge | May 25, 1943 |
| 2,419,782 | Lake | Apr. 29, 1947 |
| 2,434,500 | Leathers et al. | Jan. 13, 1948 |
| 2,550,600 | Rehm | Apr. 24, 1951 |
| 2,682,043 | Fitz | June 22, 1954 |
| 2,775,299 | Doury | Dec. 25, 1956 |
| 2,781,847 | Kilheffer et al. | Feb. 19, 1957 |

FOREIGN PATENTS

| | | |
|---|---|---|
| 197,503 | Great Britain | May 17, 1923 |
| 304,586 | Great Britain | Jan. 30, 1930 |